US006972903B2

United States Patent
Hara et al.

(10) Patent No.: US 6,972,903 B2
(45) Date of Patent: Dec. 6, 2005

(54) VISUAL AID

(75) Inventors: Hideo Hara, Suwa (JP); Kazunaga Shimizu, Hara-mura (JP); Fumiaki Koizumi, Okaya (JP); Yasuhiro Sakai, Suwa (JP)

(73) Assignees: Nittoh Kogaku K.K., (JP); Toshinori Tsuchiya, (JP)

( * ) Notice: Subject to any disclaimer, the term of this patent is extended or adjusted under 35 U.S.C. 154(b) by 0 days.

(21) Appl. No.: 10/474,415

(22) PCT Filed: Apr. 12, 2002

(86) PCT No.: PCT/JP02/03641

§ 371 (c)(1),
(2), (4) Date: Apr. 26, 2004

(87) PCT Pub. No.: WO02/084370

PCT Pub. Date: Oct. 24, 2002

(65) Prior Publication Data

US 2004/0179261 A1 Sep. 16, 2004

(30) Foreign Application Priority Data

Apr. 13, 2001 (JP) ............................. 2001-114746

(51) Int. Cl.$^7$ ........................... G02B 27/02; G02C 1/00

(52) U.S. Cl. .................. 359/482; 359/409; 359/431; 351/158

(58) Field of Search ................... 359/399–431, 359/432, 480–482, 800–819, 831–837; 351/158, 351/200–247

(56) References Cited

U.S. PATENT DOCUMENTS

| 3,883,225 | A | * | 5/1975 | Rehm .......................... 359/481 |
| 4,545,655 | A | * | 10/1985 | Fantone et al. ............. 359/399 |
| 4,704,000 | A | | 11/1987 | Pekar et al. ................. 359/482 |
| 4,714,321 | A | * | 12/1987 | Sillitto ....................... 359/407 |
| 4,795,235 | A | * | 1/1989 | Spitzberg .................... 359/404 |
| 5,028,127 | A | | 7/1991 | Spitzberg .................... 351/158 |
| 5,579,158 | A | | 11/1996 | Padula ....................... 359/482 |
| 5,680,194 | A | | 10/1997 | Pasfield ...................... 351/158 |
| 5,680,195 | A | | 10/1997 | Pekar et al. ................. 351/158 |
| 6,065,835 | A | | 5/2000 | Pekar et al. ................. 351/158 |
| 6,775,060 | B2 | * | 8/2004 | Peli et al. ................... 359/409 |

FOREIGN PATENT DOCUMENTS

| WO | WO 95/04435 A1 | 2/1995 |
| WO | WO 97/35222 A1 | 9/1997 |

* cited by examiner

Primary Examiner—Thong Q Nguyen
(74) Attorney, Agent, or Firm—Thompson Hine LLP

(57) ABSTRACT

A vision assisting apparatus includes a casing for forming an inversely U-shaped optical path, a light entry, provided at one end of the optical path, through which light enters, a light exit, provided at another end of the optical path, through which light exits in an opposite direction to the light entry, an optical system for processing an image entered via the light entry by using the optical pass and outputting a processed image via the light exit, and attaching structure for attaching the casing to a wearer so that the light exit is positioned close to an eye of the wearer. By forming the inversely U-shaped optical path with the casing, it is possible to provide a sufficiently long optical path in a compact form. Accordingly it is possible to provide the vision assisting apparatus that does not hide facial expressions, is easy to use, and can provide a sufficient length for setting a magnifying optical system without extending the distance in the horizontal direction between the light entry and the light exit.

7 Claims, 4 Drawing Sheets

--Prior Art--

--Prior Art--

VISUAL AID

TECHNICAL FIELD

The present invention relates to a vision assisting apparatus that is suited to assisting the eyesight of the weak-sighted and an apparatus that is capable of magnifying and outputting images.

BACKGROUND ART

U.S. Pat. No. 4,704,000 discloses an eyeglass-type magnifier that was developed for the low-vision person and leaves both of the wearer's hands free during use. This vision enhancing system is a monocular-type magnifying apparatus with an auto-focus function, and is used having been attached to eyeglasses (an eyeglass frame). Since the ocular lens is mounted on the upside of the eyeglasses, the apparatus is used by having the user move his or her eyes upwards.

For visually impaired people with advanced weak-sightedness, magnifiers are one of the most necessities for their everyday lives. Accordingly, magnifiers that leave both hands free during use are convenient for such people to have normal lives. However, there is the inconvenience of the user having to move his or her eye(s) upwards every time something is viewed via the magnifier, which is a major burden. Accordingly, there are demands for a magnifier or a magnifying apparatus that can be used without the user having to move his or her eye(s) up and down, with an example solution being shown in FIG. 3.

An eyesight or vision assisting apparatus 80 shown in FIG. 3 is a monocular-type magnifying apparatus that functions as a magnifier and is used by having the user 90 attach the vision assisting apparatus 80 to eyeglasses (an eyeglass frame) 81. This vision assisting apparatus 80 has a box-like casing (housing) 89 that extends horizontally, and inside this casing 89, a magnifying optical system, an electronic appliance and motor for realizing an auto-focusing function for this optical system, an optical mechanism for calculating the focal distance, and the like are housed. A light entry 4 is provided on the front of the casing 89, and an ocular lens 15 composed of three single lenses is disposed in a light exit 3 on the rear (the side that faces the user 90's eyes 91). In addition, power for driving the auto-focus function is supplied from an external rechargeable battery to the vision assisting apparatus 80 via a cable (not shown in the drawing).

The casing 89 of the vision assisting apparatus 80 is attached to a front 82a of a frame 82 of the eyeglasses 81. When the user 90 puts on the eyeglasses 81, the ocular lens 15 is set in front of the user 90's dominant eye 91a, and the casing 89 extends in a horizontal direction along the user's brow. By adjusting the eyeglass frame 82, it is always possible to set the eyesight assisting apparatus 80 at a position and angle at which it is easy for the user to see. Accordingly, the user (wearer) can use the vision assisting apparatus 80 by just looking slightly upwards without making any large upward movement of his or her eye. In addition, the eyepiece (ocular lens) 15 of the vision assisting apparatus 80 passes through an eyeglass lens 83 called the carrier lens and so is stably disposed at a desired position in front of the dominant eye 91a of the user 90 (the user's left eye in the drawing). When the user 90 is wearing the vision assisting apparatus 80, it is preferable for the user's gaze for seeing the vision assisting apparatus 80 to be slightly above, as same as looking at distant objects, to the user's normal gaze when.

FIG. 4 shows an optical system 88 that is housed in the casing 89 of the vision assisting apparatus 80. This optical system 88 includes a light entry 4 that is disposed on the front surface of the casing, a mirror 5 that guides light that has entered the light entry 4 onto an optical path that extends in the horizontal direction along the casing 89, a movable objective lens 8, a roof prism 11 that inverts the image, the ocular lens 15 that is composed of three single lenses and forms an image with the light that has been bent by the roof prism 11 towards the user's eye 91a, and the light exit 3, with these components being disposed in the stated order. Accordingly, in the vision assisting apparatus 80, an optical path (optical axis) 71 that connects the light entry 4 to the light exit 3 is formed on a single plane, so that external light 70 is guided on a single plane inside the casing 89 and reaches the user's dominant eye 91a.

The vision assisting apparatus 80 is convenient in that it leaves both hands free and can be used without the user having to move his or her eye significantly up and down, so that the user can use the vision assisting apparatus 80 all of the time for supporting or helping eyesight. Accordingly, the eyesight assisting apparatus 80 is easy to use, places little burden on the user, and is suited to constant use by visually impaired people with advanced weak-sightedness.

However, there are still a number of identifiable problems with this vision assisting apparatus 80. The position of the light entry 4 of the vision assisting apparatus 80 during use is displaced horizontally or sideways from the position of the dominant eye 91a and is located very close to the other eye 91b. This means that when the user 90 of the vision assisting apparatus 80 looks at a proximate object, the range that can be observed by the dominant eye 91a via the light entry (finder) 4 differs from the range that would normally be visible with the dominant eye 91a, resulting in the user experiencing what is referred to as "parallax".

Also, the casing 89 of the vision assisting apparatus 80 covers a large part of the user 90's face. In particular, there is the disadvantage of the casing 89 hiding the periphery of the user's eyes 91a and 91b so that the user's expression is hard to discern. This means that while the vision assisting apparatus 80 offers the convenience of leaving the user's hands free, in addition to that the apparatus has a strange feeling in viewing, and this solution does not provide users with an entirely satisfactory eyesight assisting apparatus.

By reducing the length of the casing 89 in the horizontal direction, these problems can be somewhat alleviated. However, if the length of the casing 89 is reduced, it is not possible to provide enough space for housing the optical system 88. It is possible to provide enough space by extending the casing in the front-rear direction, but when such apparatus is worn on the user's face 92, the center of gravity thereof is located away from the user's face, making the apparatus and the image viewed through it unstable. Accordingly, it is difficult to provide a vision assisting apparatus which is easy to see through.

For this reason, it is an object of the present invention to provide an assisting apparatus that is an eyesight assisting apparatus or a vision assisting apparatus and that can have a magnifying function with very little parallax being experienced, even when looking at a proximate object. It is a further object to provide a vision assisting apparatus that can be worn stably and is easy to use. Additionally, it is yet another object of the present invention to provide a vision assisting apparatus which during use hardly conceals the expression of the user, feels as natural as possible to the user, and does not place a burden on the user.

DISCLOSURE OF THE INVENTION

For the above reasons, in the present invention, a vision assisting apparatus is provided that has an optical path with bending upwards in an inverse U shape instead of being along with a horizontal plane, so that sufficient space for setting an optical system can be provided and light can be received close to and at approximately the same height as the user's relating eye. That is, the vision assisting apparatus of the present invention includes a casing for forming an inversely U-shaped optical path, a light entry, provided at one end of the optical path, through which light enters, a light exit, provided at another end of the optical path, through which light exits in an opposite direction to the light entry, an optical system for processing an image entered via the light entry by using the optical pass and outputting a processed image via the light exit, and means for attaching the casing to a wearer so that the light exit is positioned close to an eye of the wearer.

With this vision assisting apparatus, by bending the optical path upwards in an inverse U-shape, it is possible, without increasing the length in the horizontal direction between the light entry and the light exit, to make the optical path sufficiently long for setting the optical system. Accordingly, the light entry can be disposed close to the wearer (user)'s dominant eye, which makes it possible to provide a vision assisting apparatus where little parallax is experienced. In addition, with the casing for forming the inversely U-shaped optical path, a part that is close to the eye during use can be made in an inverse U-shape, so that the vision assisting apparatus of this invention thoroughly prevents the periphery of the user's eye from becoming hidden by the casing, and the user's expression can be easily seen by others. Also, the casing is inversely U-shaped in the upward direction, during using, the center of gravity of the casing is positioned close to the face without the casing being disposed very far from the brow. Accordingly, it is possible for the vision assisting apparatus to be worn stably with there being little vibration in the image, even when the wearer moves. In this way, by using an optical path in an inverse U-shape, it is possible to provide a vision assisting apparatus that can be worn stably and with which little parallax is experienced, even when looking at a proximate object. Also, it is possible to provide a vision assisting apparatus that feels natural to use and hardly hides the user's expression.

In addition, with the vision assisting apparatus of the present invention, the distance between the light entry and the light exit is narrow, so that when the light exit is disposed almost directly in front of one of the wearer's eyes, the light entry can be prevented from hiding the wearer's other eye. Accordingly, it is possible to dispose the light exit, that is, the ocular lens, almost directly in front of one of the wearer's eyes without sacrificing the field of view of the wearer's other eye. This means that it is possible to provide a vision assisting apparatus which can be used without sacrificing the field of view of the wearer's other eye, even when the light exit is disposed so that the wearer does not have to move his or her eye up and down. In this way, the vision assisting apparatus places even less burden on the wearer.

In addition, the vision assisting apparatus of the present invention has an inversely U-shaped optical path, so that arrangement of the light entry and the light exit can be desired to be in the horizontal direction. Accordingly, the light entry and the light exit can be aligned approximately horizontally with no difference in the heights of the position of the wearer's eye and the light entry, which can reliably prevent parallax from being experienced in the vertical direction, especially when looking at a proximate object.

In this way, by making the optical path inversely U-shaped, the vision assisting apparatus of the present invention can provide sufficient optical distance between the light entry and the light exit while making it possible to adjust the actual distance. Accordingly, a variety of optical systems for assisting eyesight or vision, such as an optical system for correcting myopia, hypermetropia, astigmatism, or the like, or assisting or compensating for weak sight can be arranged using the optical path. In particular, this apparatus is suited to housing a magnifying optical system for the weak-sighted, which tends to include a large number of lenses. That is, the vision assisting apparatus of the present invention is suited to housing a magnifying optical system for magnify the image from the light entry by using the optical path and output an erect real image from the light exit, thereby providing a user with a telescope function or magnifying glass (magnifier). With this vision assisting apparatus, a magnifying optical system is housed and the light entry can be disposed in the center of the wearer's face, so that an image is obtained where one eye looks out from the center of the face. In addition, the light exit is positioned close to the nose, so that both ends and/or the periphery of the wearer's eyes can be seen, resulting in the magnifier of this invention that allows the wearer's expression to be easily discerned. Accordingly, an image that is approximately the same as that obtained when looking with both eyes can be obtained with one eye, so the magnifier that leaves both hands free and has little parallax in the horizontal direction can be provided. That is, the vision assisting apparatus of this invention includes a construction where the light entry and light exit are aligned approximately horizontally and the light entry is positioned in the approximate center of the wearer's face, with having a magnifying function, that makes it easy for the user to see, and which places little burden on the user.

In addition in this vision assisting apparatus, it is possible to provide space for providing the optical path with a mechanism that can automatically adjust the focus of the magnifying optical system, that is, an auto-focus module, so that images with no blurring from near positions to far positions can be stably supplied from the light exit to the user's eye.

The inversely U-shaped optical path can be extended as necessary upwards from the position of the eye. However, in order to wear the apparatus stably, it is preferable for the dimensions of the casing in the vertical direction to be set so that the casing fits into the range from the wearer's eye to the brow or forehead. The vision assisting apparatus of the present invention can be attached to a helmet, a hat, a hair band, etc, and can be supported by the head, the brow, the ears, and/or the nose. In addition, it is possible to use a normal eyeglass frame as a means for supporting, so that the apparatus can be worn stably using the ears and nose in the same way as normal eyeglasses.

BEST MODE FOR CARRYING OUT THE INVENTION

Figure 1:
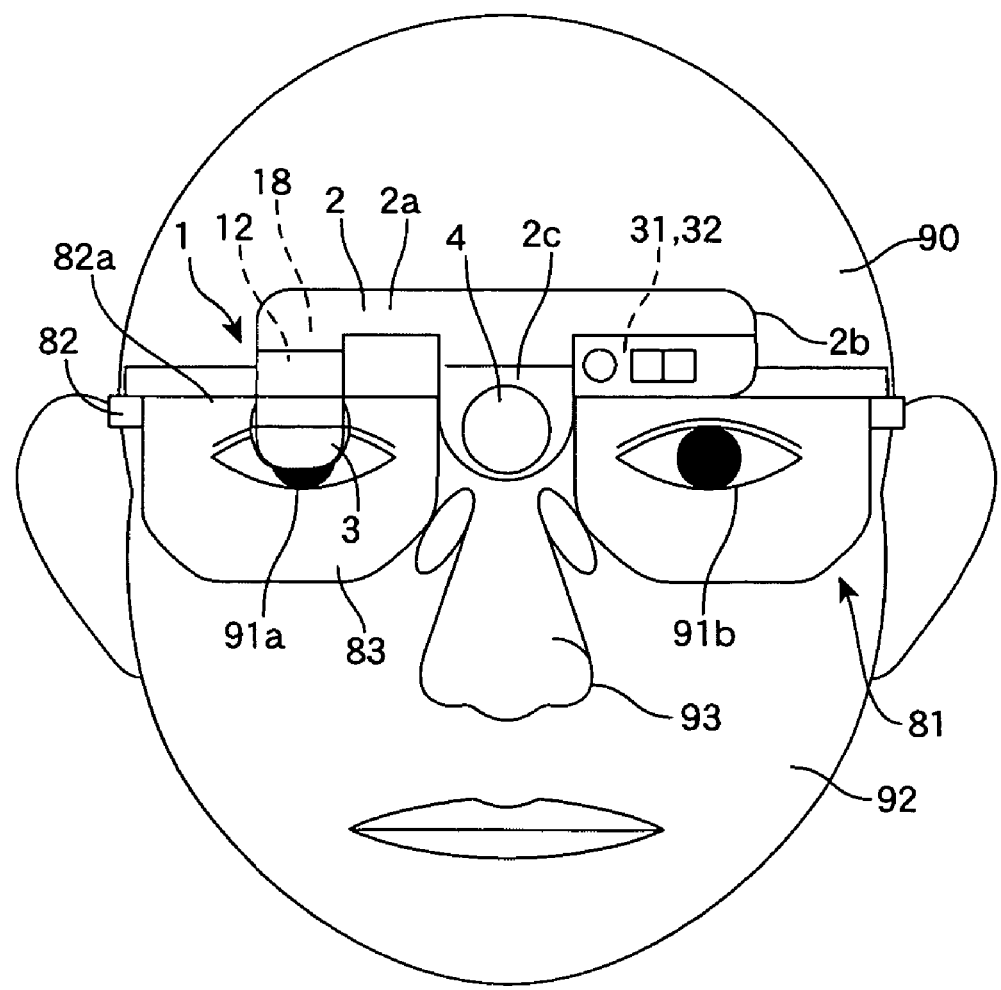
FIG. 1 shows how a user wears one of vision assisting apparatus according to the present invention.

The following describes an embodiment of the present invention with reference to the attached drawings. FIG. 1 shows how a vision assisting apparatus 1 according to the present invention is worn by a user 90. The vision assisting apparatus 1 of the present embodiment is attached to a horizontally extending part 82a of an eyeglass frame 82, and can be worn by the user 90 in the same way as eyeglasses. The vision assisting apparatus 1 has a housing or casing 2 that is shaped in its entirety like the letter "F" that has been rotated by 90 degrees and inverted, with the left side (when looking from the front) being a casing 2a that forms an approximately inversely U-shaped optical path and the right side being a rectangular casing 2b that extends horizontally. An optical path 18 that composes a magnifying optical system 12 of the vision assisting apparatus 1 is housed and/or formed in the left casing 2a that is in an inverted U-shape, and an autofocus module 32 is housed in the right casing 2b that extends horizontally.

A circular light entry (input window) 4 that faces in the forward direction 1a so that external light 70 can enter is disposed at a right end of the inverted U-shaped left casing 2a in a part that is an approximate center 2c of the casing 2, while a light exit (output window) 3 that faces in a rear direction 1b is disposed at the left end of the casing 2a in a part that is aligned horizontally with the light entry 4 when the vision assisting apparatus 1 is worn. Accordingly, when the vision assisting apparatus 1 is worn on the user's face 92, the light entry 4 is positioned close to the user 90's nose 93, and the light exit 3 is positioned near to or in approximate contact with the user's eye 91a. The light exit 3 passes through part of an eyeglass lens 83 that is attached to the eyeglass frame 82, so that the light exit 3 is stably supported at a predetermined position in front of one eye 91a of the user 90. In addition, a magnifying optical system 12, which can magnify an image that enters via the light entry 4 and output an erect real image magnified by the system 12 via the light exit 3, is disposed inside the left casing 2a.

A stepping motor 31 for driving an objective lens 8 of the magnifying optical system 12 and an autofocus module (AF module) 32 are housed in the casing 2b that extends on the opposite side to the light exit 3 from the light entry 4 in the center, with the power for driving the stepping motor 31 and the AF module 32 being supplied from an external rechargeable battery to the casing 2 via a cable (not show in the drawing). It is also possible to house a small battery in the casing 2b and to drive these parts using this battery.

Figure 2:
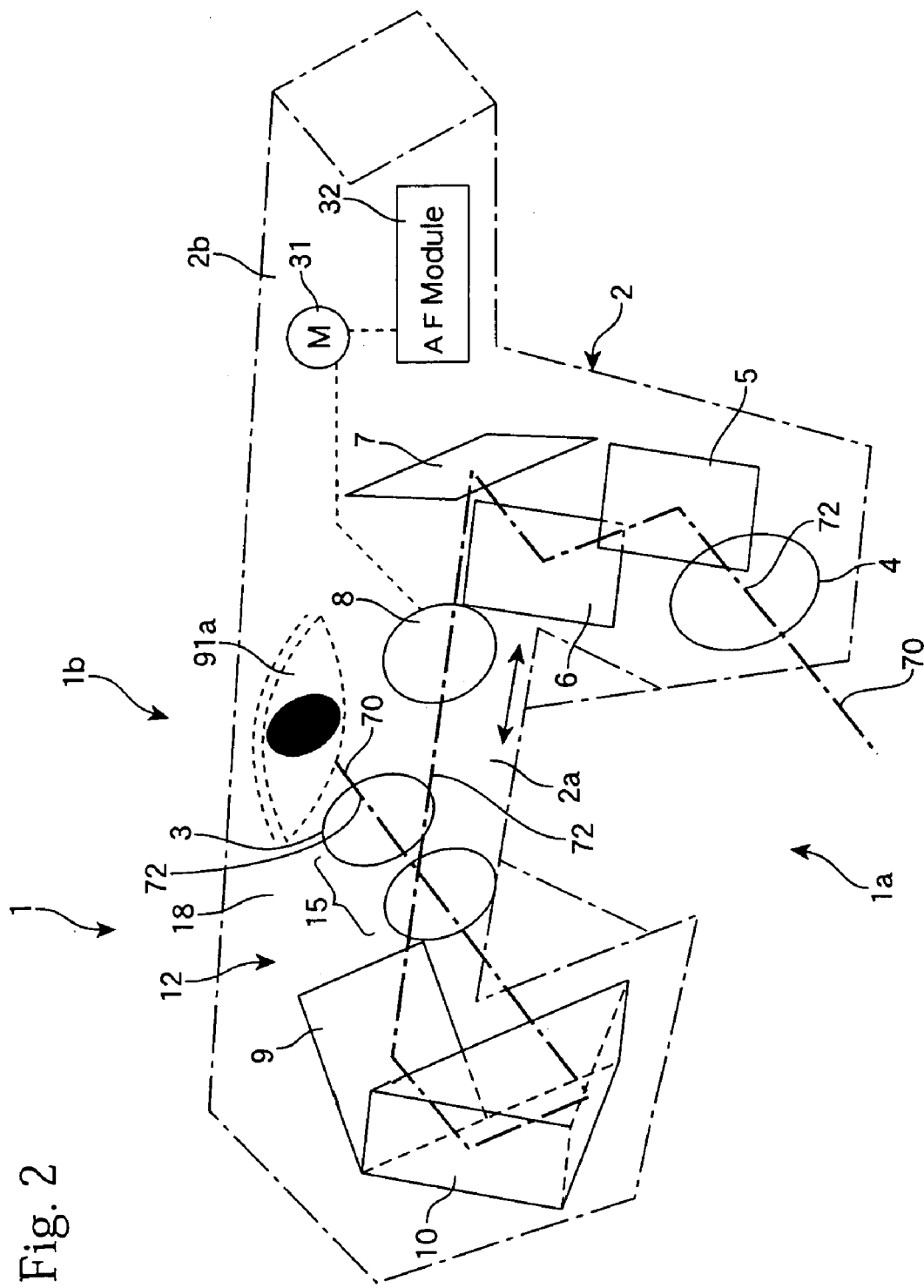
FIG. 2 shows an optical path of the vision assisting apparatus shown in FIG. 1.
Figure 3:
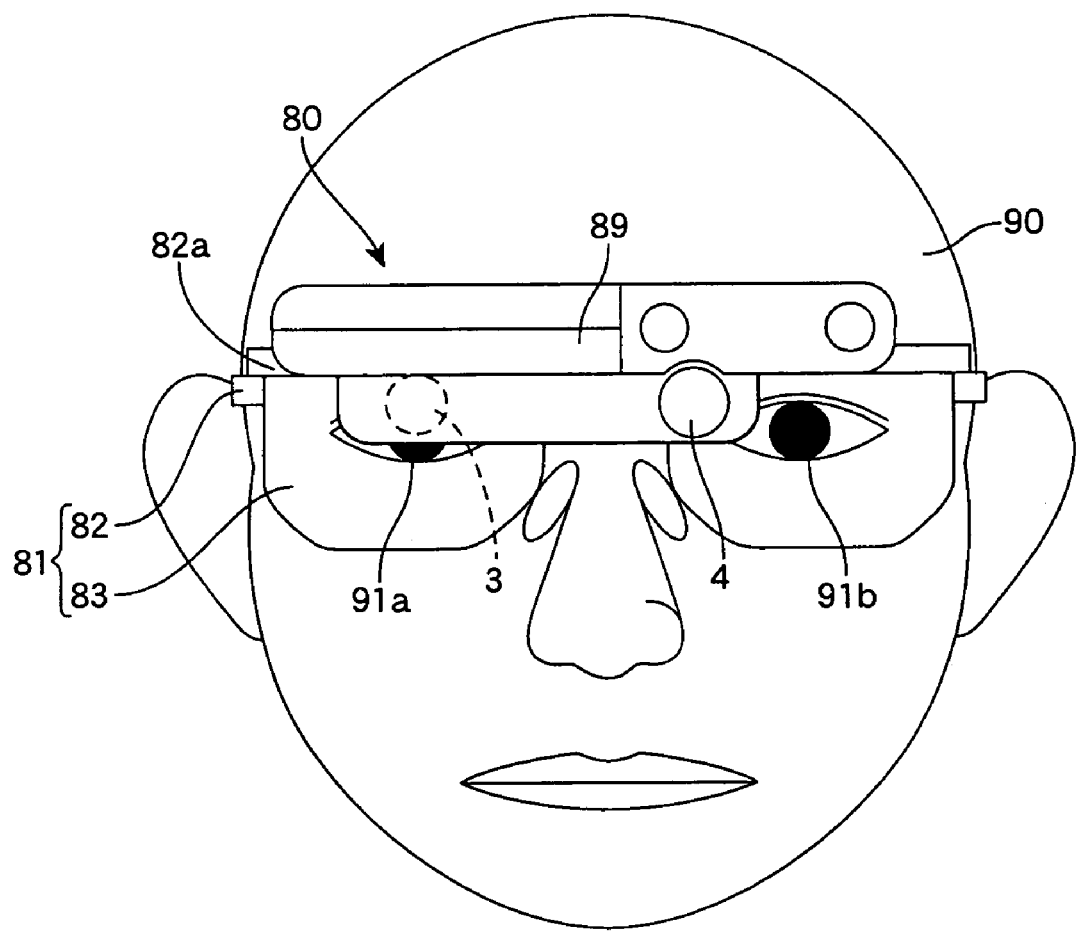
FIG. 3 shows how a user wears one example of a vision assisting apparatus that is compared with the present invention.
Figure 4:
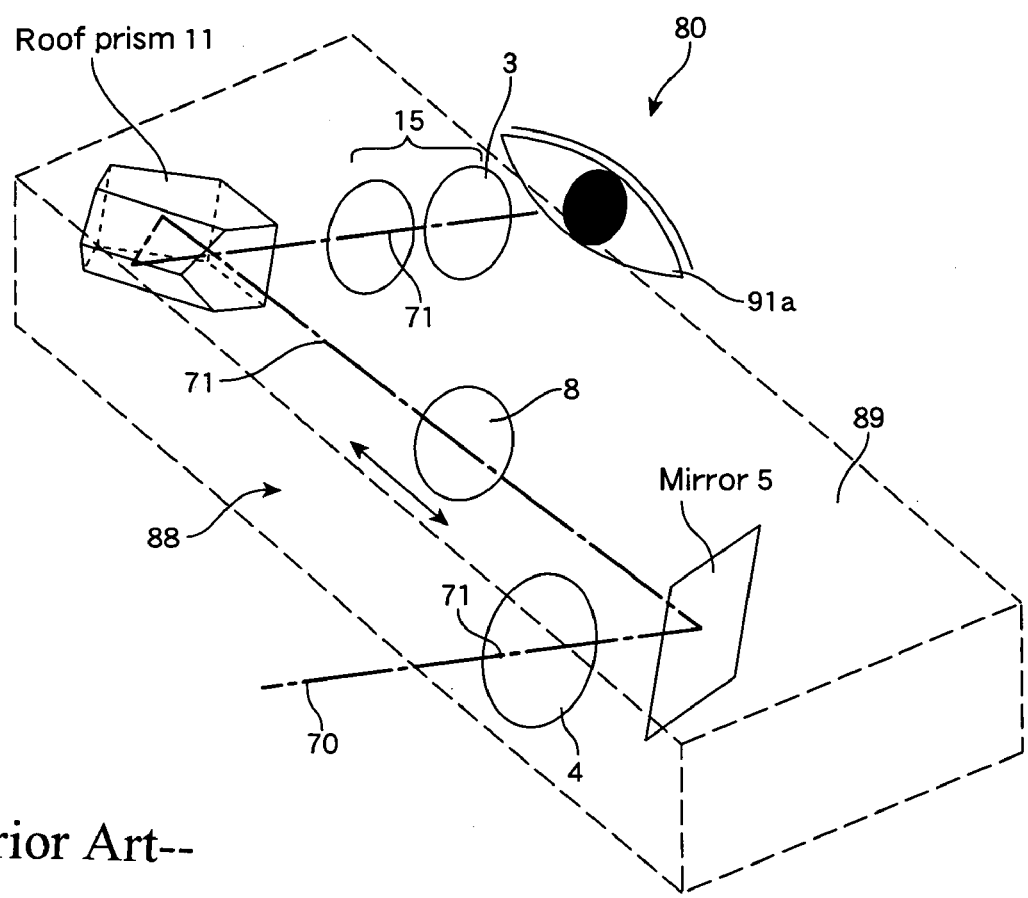
FIG. 4 shows an optical path of the vision assisting apparatus shown in FIG. 3.

FIG. 2 shows the overall construction of the magnifying optical system 12 of the vision assisting apparatus 1. This magnifying optical system 12 is arranged using the optical path 18 inside the approximately U-shaped casing 2a on the left, with this casing being shown by the dot-dash line. In order to compose the magnifying optical system 12, the following components are disposed in order on the optical path 18 starting from the light entry 4 side: a first mirror 5 that reflects ("raises") incident light 70 so as to lead the light 70 upwards along a vertical part on the right side of the inversely U-shaped casing 2a; a second mirror 6 that reflects the light 70 that has been guided vertically in the horizontal direction; a third mirror 7 that reflects the light 70 so as to lead the light along a horizontal part of the inversely U-shaped casing 2a; an objective lens 8 that is disposed so as to be able to move left and right (back and forth on the optical path) in the horizontal part of the inverse U-shape; a fourth mirror 9 that bends the light 70 in the horizontal direction so as to guide the light 70 to a prism 10 that is disposed in a vertical part on the left side of the inversely U-shaped casing 2a; the right-angled prism 10 that is disposed in the vertical part and inverts the image; and an ocular lens 15 that is composed of two lenses and emits the light 70 that has exited the right-angled prism 10 in the horizontal direction from the light exit 3 as an image that can be viewed using the eye (observing eye) 91a. The objective lens or lens system 8 and the ocular lens or lens system 15 can be also composed of single lens, multiple lenses, or a plurality of lens groups respectively.

The objective lens 8 can move left and right along a horizontal optical axis 72 between the third mirror 7 and the fourth mirror 9, and is moved by the stepping motor 31 based on control by the AF module 32 so that focusing can be performed automatically in accordance with the distance to an object in front of the light entry 4. A magnified erect real image is outputted from the light exit 3 by the magnifying optical system 12.

In the vision assisting apparatus 1, by providing the approximately U-shaped optical path 18 inside the casing 2, the rays 70 are received, at the first, by the light entry 4 being located at the same height as the eye 91a, the optical axis 72 of the rays 70 is shifted, at the second, to a higher position than the eye 91a, the optical axis 72 becomes horizontal at the third, the optical axis 72 is restored, at the fourth, to the original height, and finally the optical axis 72 is led to the ocular lens 15 of the light exit 3. Accordingly, without extending the distance in the horizontal direction between the light entry 4, which is one end (the entry) of the optical path 18, and the light exit 3, which is the other end (the exit), it is possible to provide a sufficient length for the optical path on which the magnifying optical system 12 is set. This means that even if the entire length of the optical path needed for the magnifying optical system 12 required as the vision assisting apparatus 1 is more than half the distance between both eyes 91a and 91b, it is still possible to dispose the light entry 4 near the center of the face 92. Accordingly, it is possible to dispose the light entry 4 at a position near in distance and angle to realize the condition where the user usually get by the dominant eye 91a that faces the light exit 3, which makes it possible to output magnified images with little parallax being experienced from the light exit 3. In particular, when viewing a proximate object, if the image that enters the right eye 91a is close to the image that would ordinarily enter the left eye 91b, significant parallax is experienced, causing tiredness. With the vision assisting apparatus 1 of the present embodiment, the image that enters the dominant right eye 91a is close to the image that would ordinarily enter this right eye, so that little parallax is experienced. This means that it is possible to provide a vision assisting apparatus that is easy to see through and is not burdensome.

The position of the vertical direction for the light entry 4 can be adjusted according to an arrangement of the optical path 18. By arranging the light entry 4 and the light exit 3 so as to be aligned approximately at same level as horizontal, when the apparatus 1 is worn, the difference in angle between the image that enters the eye 91a and the image that would ordinarily be seen by the eye 91a can be almost entirely eradicated. Accordingly, the vision assisting apparatus 1 is even easier to see through and places little burden on the user.

The light entry 4 can be positioned even closer to the light exit 3 by reducing the length of the optical path 18 in the horizontal direction. However, in the vision assisting apparatus 1 of the present embodiment shown, the light entry 4 is positioned in the center of the face 92, where the bridge of the nose 93, when the vision assisting apparatus 1 is worn on the face 92 of the user (wearer) 90. By having the light entry 4 disposed in the center of the face 92, the nose-side of the eye 91a can be seen via the gap in the inverse U-shaped casing 2a that connects the light entry 4 and the light exit 3. Accordingly, a situation where the vision assisting apparatus 1 hides the periphery of the eye 91a is reliably prevented and persons in front of the user 90 wearing the vision assisting apparatus 1 can clearly discern the expression of the user 90. In addition, since the arrangement of this apparatus 1 does not hide the facial expression, it is possible to make the vision assisting apparatus 1 so that the light exit 3 is positioned almost in front of the eye 91a of the user 90 with little affect on the user's everyday life, the user is able to see magnified images without moving his or her eye 91a up and down, and little stress is experienced by the user.

In addition, by positioning the light entry 4 in approximately the center of the face 92, it is possible to provide sufficient distance in the horizontal direction for the inverse U-shaped optical path 18. Accordingly, without so much extending the optical path 18 upwards and downwards for achieving the required length for the optical path, and the design of the vision assisting apparatus 1 dose not become a design away from the brow but becomes a design with the casing 2a that approximately fits the brow of the face in spite of being inversely U-shaped. This means that the vision assisting apparatus 1 has a favorable appearance when worn, and the casing 2a extends approximately along the user's brow and not so far from the user's brow, resulting in favorable stability. Accordingly, even if the user moves his or her body or face, there is little vibration in the image obtained via the light exit 3, which makes it especially easy to look through the eyesight assisting apparatus.

As described above, the vision assisting apparatus of the present invention can be used with both hands free, making the eyesight assisting system easy to use. By using an optical path whose approximate form is an inverse U shape, it is possible to provide a sufficient optical distance while placing the light exit and the light entry close together with the light entry disposed close to the dominant eye, one example shown above, the light entry locates in approximately the center of the wearer's face. This means that there is little displacement in the viewpoint from the dominant eye, even when observing a proximate object, so that a vision assisting apparatus with very little parallax or other peculiarities can be provided.

In addition, it is possible to provide a vision assisting system, by using an inverse U-shaped optical path, where even though the light exit is positioned in front of the eye during use, most of the periphery of the user's eye is not hidden by the vision assisting apparatus itself. Therefore, it is possible for the user to utilize the vision assisting apparatus without moving his or her eye up and down without the user's expression being hidden. Accordingly, by wearing the vision assisting apparatus of the present invention, the user can view a magnified image without experiencing stress, and the vision assisting apparatus becomes easy to use and has natural feeling to other people without looking peculiar.

It should be noted that in the vision assisting apparatus 1 explained above will not limit the scope of this invention, an optical system that corrects other visual impairments such as myopia (near-sightedness), hypermetropia (far-sightedness), or astigmatism, or an optical system that functions as a telescope, a microscope, etc., and so further enhances or supports normal vision or eyesight can be housed in place of the magnifying optical system 12 for the weak-sighted, resulting in a wide range of uses for the vision assisting apparatus 1. The casing 2 of the vision assisting apparatus 1 of the present embodiment can be attached to a helmet, a hat, a hair band, or the like and can be worn on the face 92 using the head, the ears, and/or the nose. By mounting the vision assisting apparatus on the eyeglass frame 82, the vision assisting apparatus 1 can be worn in the same way as eyeglasses without looking peculiar. The overall form of the casing 2 is not limited to the present embodiment, and any form that can house an approximately inversely U-shaped optical path may be used. The casing, such as described above, having a form that is suitable to wear around the brow is favorable in looking nice and in stably wearable. When a specification of a vision supporting apparatus includes an AF module or the like, a casing that includes a part that realizes the inversely U-shaped optical path described above and a part extends horizontally from this part and can house the AF module or the like is one example of a preferred form.

INDUSTRIAL APPLICABILITY

The vision assisting apparatus of the present invention is an eyesight assisting, supporting or enhancing apparatus that can be used with both hands free. An optical path of sufficient length can be provided with a compact external appearance, so that a vision assisting apparatus that is compact, easy to use, and provides a magnifier function for the weak-sighted, a corrective function for users with other visual impairments, and other functions such as a telescope or microscope can be provided.

What is claimed is:

1. A vision assisting apparatus, comprising:
    a casing for forniing an inversely U-shaped optical path;
    a light entry, provided at one end of the optical path, through which light enters;
    a light exit, provided at another end of the optical path, through which light exits in an opposite direction to the light entry;
    an optical system for processing an image entered via the light entry by using the optical path and outputting a processed image via the light exit; and
    means for attaching the casing to a wearer so that the light exit is positioned close to an eye of the wearer;
    wherein the light entry is to be positioned in a central part of the face of the wearer.

2. A vision assisting apparatus according to claim 1, wherein the optical system is a magnifying optical system for magnifying the image entered via the light entry by using the optical path and outputting an erect real image from the light exit.

3. A vision assisting apparatus according to claim 2, further comprising a mechanism for automatically adjusting a focus of the magnifying optical system.

4. A vision assisting apparatus according to claim 1, wherein the light exit is to be positioned in front of the eye of the wearer.

5. A vision assisting apparatus according to claim 1, wherein the light entry and the light exit are disposed so as to be aligned approximately horizontally.

6. A vision assisting apparatus according to claim 1, wherein the casing fits into a region from the eye to the brow of the wearer.

7. A vision assisting apparatus according to claim 1, wherein the means for attaching is an eyeglass frame.

* * * * *

UNITED STATES PATENT AND TRADEMARK OFFICE
CERTIFICATE OF CORRECTION

PATENT NO. : 6,972,903 B2
DATED : December 6, 2005
INVENTOR(S) : Hideo Hara et al.

It is certified that error appears in the above-identified patent and that said Letters Patent is hereby corrected as shown below:

Column 8,
Line 32, change "forniing" to -- forming --.

Signed and Sealed this

Seventh Day of February, 2006

JON W. DUDAS
*Director of the United States Patent and Trademark Office*